United States Patent
Zon

[15] 3,692,336
[45] Sept. 19, 1972

[54] PIPE CONSTRUCTION

[72] Inventor: Cornelis Van Zon, Zwolle, Netherlands

[73] Assignee: Industriele Onderneming Wavin N.V., Zwolle, Netherlands

[22] Filed: Oct. 27, 1970

[21] Appl. No.: 84,417

[52] U.S. Cl. ................. 285/175, 285/255, 285/321, 285/369
[51] Int. Cl. ............................................. F16l 21/08
[58] Field of Search ...... 285/113, 104, 344, 175, 318, 285/321, 339, 323, 111, 255, 369

[56] References Cited

UNITED STATES PATENTS

| 2,259,453 | 10/1941 | Beyer et al. | 285/339 X |
| 2,346,051 | 4/1944 | Seamark | 285/104 X |
| 2,449,795 | 9/1948 | Stillwagon | 285/104 |
| 3,462,175 | 8/1969 | Johnson | 285/113 X |
| 581,050 | 4/1897 | Wentz | 285/175 |
| 3,494,639 | 2/1970 | Smith | 285/344 X |
| 2,848,135 | 8/1958 | Richard et al. | 285/318 X |
| 701,020 | 5/1902 | Diescher | 285/318 X |
| 1,119,752 | 12/1914 | Goethner et al. | 285/175 X |

FOREIGN PATENTS OR APPLICATIONS

| 650,640 | 7/1964 | Belgium | 285/104 |
| 605,006 | 7/1948 | Great Britain | 285/111 |
| 108,269 | 1/1966 | Norway | 285/113 |
| 741,206 | 11/1955 | Great Britain | 285/113 |

Primary Examiner—Thomas F. Callaghan
Attorney—James E. Nilles

[57] ABSTRACT

A tensile stress resistant pipe connection comprising two male pipes and a sleeve with two conically tapering recesses, sealing means at the ends of the sleeve and coupling means situated in said recess, the free end of one male pipe in the recesses being provided with left hand screw thread, a free end of the other one with right hand screw thread of about the same pitch.

8 Claims, 1 Drawing Figure

PATENTED SEP 19 1972
3,692,336
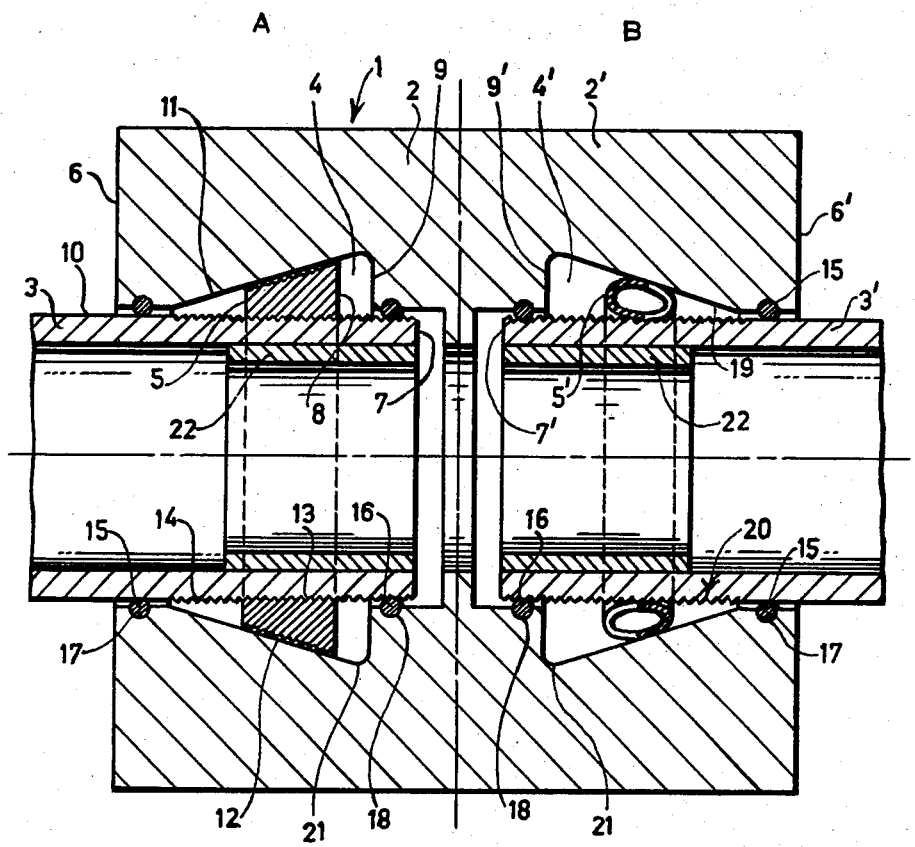
INVENTOR
CORNELIS VAN ZON
BY
James E. Nilles
ATTORNEY

PIPE CONSTRUCTION

Tensile stress resistant pipe connections, whereby from the outer side and through an aperture in the female pipe apart rod-shaped material, e.g. plastic rod or flexible metal band, is inserted into a recess in the female part and into a recess opposite thereto in the male pipe part, are commonly known. These connections have the drawback that in order to obtain the tensile stress resistant connection it is necessary to weaken the wall of the male pipe part owing to the provision of a groove for accommodating the coupling means.

It is now an object of the invention to provide a pipe connection of the afore mentioned type in which the difficulties referred to above are obviated and a connection is obtained which at all times is absolutely tensile stress resistant without the implication of inserting coupling means from the outside and providing a groove in the male pipe part.

This object is attained according to the invention in the way that in a pipe connection comprising a female pipe part and a male pipe part, sealing means situated between the female and the male part, and coupling means for connecting in a tensile stress resistant way said male and female pipe parts in the inner side of the female pipe part a recess is provided with such a shape and dimensions that the end of the male pipe part can be slid past the coupling means accommodated in this recess, while on the other hand the surface of the coupling means cooperates in such a way with the outer wall of the male pipe part, when the male pipe part and the female pipe part are again moved apart, that as a consequence the coupling means are taken along with the male pipe part and clamped between the outer side of the male pipe part and the wall of the recess whilst forming a tensile stress resistant connection.

The coupling means consist advantageously of a spiral spring or a conically split ring, while one or both surfaces thereof that cooperate with the pipe parts are provided with ribs, screw thread or pin shaped projections.

Preferably at least one and efficiently the two walls of the coupling means cooperating with the walls of the pipe parts consist of a material of an equal hardness as or harder than the material of the wall of the pipe parts to be connected.

The afore mentioned pipe connection is very suitable for connecting in a tensile stress resistant way thermoplastic pipe parts, like polyethylene and particularly polypropylene while applying coupling means in the shape of a steel spiral spring, a threaded, split ring made of polyvinylchloride, particularly a hard polyvinylchloride, which on one or both surfaces cooperating with the male and female pipe part has pin-shaped projections or is profiled in an other way. If desired also a polyvinylchloride ring provided with a surface layer of hard polyvinylchloride may be used.

By employing such deformable coupling means with a surface harder than the pipe parts to be connected the hard profile will penetrate into the thermoplastic material and in this way an absolutely dependable stress resistant connection will be achieved.

On using thermoplastic pipe parts and e.g. a coupling means consisting of a steel ring, it is advisable, in order to prevent deformations in the wall of the male pipe part, owing to the pressure exerted by the coupling means, to provide a steel sleeve therein.

In order to promote a cooperation between the coupling means and the male pipe part the outer side of the end part of the male pipe part may also be profiled, e.g. be threaded. Hereby even with smooth coupling means it is possible to achieve that e.g. coupling means gripping the male pipe part are taken along.

The invention will now be clarified with reference to the drawing in which an embodiment is represented, the part A of the FIGURE showing a pipe connection according to the invention with a conical ring as a coupling means and the part B showing a circular wound spring as a coupling means.

In these figures a pipe connection is represented comprising a female pipe part in the shape of a sliding sleeve 1 of polyethylene with two female pipe parts 2 and 2' of similar polyethylene. In the female pipe parts 2 and 2' is a male pipe part 3, 3', respectively. In the parts 2 and 2' of the sliding sleeve are recesses 4, 4' for accommodating the coupling means 5, 5', respectively. Instead of polyethylene other thermoplastics such as polypropylene or pvc may be used.

The coupling means 5 of a conically split ring of polyethylene (of the same hardness as or harder than the polyethylene of the pipes and/or sleeve) are introduced from the free end 6 of the female pipe part 2 into a conically tapering recess 4, whereupon the male pipe part 3 is inserted. The split ring 5 has an inner diameter such that the end 7 of the male pipe part 3 can pass while the ring 5 by its end wall 8 is pressed against the end wall 9 of the recess 4. Since on the other hand the split ring is formed in such a way that same grips the outer wall 10 of the male pipe part 3, the ring 5 is taken along when the male pipe part 3 is retracted from the female pipe part 2 and becomes wedged between the outer wall 10 of the male pipe part 3 and the wall 11 of the recess 4 tapering in the direction of the free end 6 of the female pipe part.

The surface of the outer wall 10 of the male pipe part 3 is advantageously provided with a screw thread or ribs 14.

The surface 12 of the ring 5, which cooperates with the wall of the recess 4 is conveniently profiled e.g. in the shape of ribs and preferably of screw thread. Also the surface 13 is preferably threaded.

On retracting the male pipe part from the female pipe part the ribs or the screw thread 14 will contribute to the formation of a proper tensile stress resistant connection and also enable the ring 5 to be taken with.

Furthermore sealing means 15, 16, respectively are provided which are accommodated in a recess 17, 18, respectively of the female pipe part. These sealing means are indispensable when the free end of outer surface 13 of pipe 3 and the corresponding surface of pipe 3' are provided with screw thread or other profilation allowing liquid to escape from the inner side to the outer side.

A particular advantage of this construction as shown in the left part of the figure is that the coupling means are situated in a region where the inner pressure on pipe 3 and the outer pressure on pipe 3 in recess 4 are substantially equal. This construction prevents any damage to the pipe, which cannot be excluded when there is any pressure difference between the inner and outer side of the pipe in the region of cooperation between coupling means 5 and pipe 3.

In the right part B of the figure an analogous pipe connection is represented, however, while applying a closed circular spiral spring 5' of steel wire. The windings of this metal spring penetrate then, when e.g. polyethylene pipes are used for the male and female pipe part, into the wall 19 of the recess 4', and into the profiled wall 20 of the male pipe part 3' and ensure an absolutely tensile stress resistant connection.

In order to obtain a proper tensile stress resistant connection at least the surface of the coupling means 5, 5' that is to say ring, spiral spring and the like, is preferably made of a material harder than the surfaces of the pipe parts to be connected.

The split ring 5 can e.g. consist of hard polyvinylchloride when the polyethylene pipes are connected in a tensile stress resistant way.

If desired a steel sleeve 22 may be provided in the ends 7 and 7' of the male pipe parts 3 and 3'.

In order to avoid symptons of fracture the corner 21 of the recess 4 and the corner 21' of the recess 4' are rounded. The end walls 9 and 9' should be constructed in such a way than on moving inwards the male pipe part the coupling means 5, 5' are retained with respect to the male pipe part 3,3'.

The sliding sleeve represented in the drawing is provided with an abutment edge, but this is not necessary. Without an abutment edge it is possible, in case of a male pipe part on which the profiled portion ends at some distance from the end (7,7') that the pipe part 3 after having become wedged is slid back again and to grip, by means of a tool, from the end of part 2' of the sliding sleeve the ring-shaped coupling means and subsequently pull outwards the pipe part 3. After the pipe part 3' has been mounted this is obviously no longer possible.

It is evident that the split solid ring 5 may also consist of metal which in particular cases is preferably with thermoplastic pipes. It is also possible to use e.g. a plastic ring consisting of hard polyvinylchloride the surfaces of which consist of a hard metal, these surfaces being e.g. profiled, whereby also the desired tensile stress resistant connection is obtained.

In order to remove a pipe 3 or 3' from the inner side of the sleeve 1, also connected with a pipe 3' and coupling means 5' having a similar shape as coupling means 5, it is recommended to provide the complete free end of the outer surface 13 of pipe 3 with right handed screw thread and the complete free end of the outer surface of pipe 3' with left handed screw thread of the same pitch or vice versa. It will be obvious that in those cases the surfaces of the coupling means cooperating with the outer surfaces of pipes 3 and 3' have screw thread adapted to the screw thread of outer surfaces of pipe 3 and 3'.

In this way the sleeve 1 can be screwed to the left or to the right depending on the screw thread until the ends 7 or 7' of pipes 3 or 3' are completely free from the sleeve 1. The pipe 3 or 3' can now be removed and afterwards the connection will be restored by screwing sleeve 1 in the direction of pipe 3 or 3'. It will be obvious that in this embodiment the inner collar of sleeve 1 between 7 and 7' must be absent.

What I claim is:

1. A pipe connection comprising a female pipe part and a male pipe part, sealing means situated and between and sealingly engaging the female and male parts, annular coupling means of at least the same hardness as the pipe parts for connecting in a tensile stress resistant way the male and female parts, said female part being provided on the inner side thereof with a single annular recess conically tapering inwardly in the direction of the free end of the female pipe part and of a shape and dimensions such that the end of the male pipe part can be slid past the coupling means accommodated in said recess, the surface of the coupling means cooperating in such a way with the outer surface of the wall of the male pipe part, when the male part and the female part move away from each other, that the coupling means are moved thereby with the male part and become wedged between the outer side of the male pipe part and the wall of the recess while forming a tensile stress resistant connection, the free end of a male pipe part being provided with a screw thread which cooperates with a similar screw thread on the cooperating surface of the coupling means, and a sleeve provided in the inner side of male part opposite the coupling means in order to prevent deformation of the male pipe part.

2. A pipe connection according to claim 1, wherein the coupling means consist of a closed spiral spring and said sealing means are accommodated between the end of the female pipe part and said male pipe part.

3. A pipe connection according to claim 1 comprising one female pipe part and two male pipe parts wherein the free end of the outer surface of a first male pipe part is provided with a right hand screw thread and the free end of the outer surface of the second male pipe part with a left hand screw thread of about a similar pitch, said female pipe part being provided with a second annular recess, and second annular coupling means are positioned in said second recess and cooperate with the left hand screw thread of the second male pipe part.

4. A pipe connection according to claim 3, wherein the female and male pipe parts consist of thermoplastic material.

5. A pipe connection according to claim 4 wherein said thermoplastic material is polyethylene.

6. A pipe connection according to claim 4 wherein said thermoplastic material is polypropylene.

7. A pipe connection according to claim 1 wherein said sleeve is metal.

8. A pipe connection according to claim 1 wherein the coupling means consist of a ring which is longitudinally split and conically constructed and said sealing means are accommodated between the end of the female pipe part and said male pipe part.

* * * * *